United States Patent [19]

Howe, Jr.

[11] 4,286,422
[45] Sep. 1, 1981

[54] WALKING BEAM BAG LOADER
[75] Inventor: Milton A. Howe, Jr., Spartanburg, S.C.
[73] Assignee: W. R. Grace & Co., Cryovac Division, Duncan, S.C.
[21] Appl. No.: 107,485
[22] Filed: Dec. 26, 1979

Related U.S. Application Data
[63] Continuation of Ser. No. 865,039, Dec. 27, 1977, abandoned.

[51] Int. Cl.³ .................... B65B 5/04; B65B 67/04
[52] U.S. Cl. ........................... 53/473; 53/258; 53/391; 198/774; 198/776
[58] Field of Search ............... 53/473, 258, 259, 391, 53/570, 459; 198/774, 775, 776

[56] References Cited
U.S. PATENT DOCUMENTS

| | | | |
|---|---|---|---|
| 1,000,828 | 8/1911 | Lorillard | 198/776 |
| 1,343,373 | 6/1920 | Pedersen | 198/776 |
| 2,497,768 | 2/1950 | Hallead | 198/774 |
| 2,722,406 | 11/1955 | Kurek | 198/774 X |
| 3,161,284 | 12/1964 | Ashworth | 198/774 |
| 3,505,789 | 4/1970 | McKay | 53/259 |
| 3,619,969 | 11/1971 | Holcombe | 53/570 X |
| 3,638,390 | 2/1972 | Kupcikevicius | 53/391 X |
| 3,722,662 | 3/1973 | Wakabayashi et al. | 198/774 X |
| 4,081,096 | 3/1978 | Kupcikevicius | 53/259 X |

FOREIGN PATENT DOCUMENTS

| | | | |
|---|---|---|---|
| 839002 | 6/1960 | United Kingdom | 198/774 |
| 1371766 | 10/1974 | United Kingdom . | |
| 1521748 | 8/1978 | United Kingdom . | |

Primary Examiner—Horace M. Culver
Attorney, Agent, or Firm—John J. Toney; William D. Lee, Jr.; Joseph P. Harps

[57] ABSTRACT

Disclosed is a method and apparatus for loading articles, particularly meat articles, into containers. The apparatus comprises two groups of movably mounted beams cantilevered in a direction of article progression. One group of beams is movable in a vertical direction while the other group of beams is movable in a horizontal direction. The movement of the beams is synchronized to provide for article movement in the desired direction. The terminal portions of both sets of beams are unconnected and spaced apart so as to provide a spaced relationship between the group of beams to permit the insertion of a container over the terminal portions of the beams.

7 Claims, 5 Drawing Figures

WALKING BEAM BAG LOADER

This is a continuation of application Ser. No. 865,039 filed Dec. 27, 1977 and now abandoned.

BACKGROUND OF THE INVENTION

The invention disclosed herein relates generally to the art of loading articles into containers and more particularly to a method and apparatus for loading fresh meat articles into flexible plastic containers. Meat articles have conventionally been manually loaded into flexible plastic packages for either shipment or display. While many aspects of meat packaging process had been refined to a high degree of automation, the actual step of placing meat articles into containers has remained a substantially manual operation wherein an operator receives the cut of meat from a conveyor, selects an appropriately sized container and slides the meat from a shelf into the container. The subsequent processing steps of vacuumizing, clipping and shrinking are highly automated but remain dependent upon being supplied from a manual container loading step.

An attempt to overcome the shortcomings of prior art manual handling of meat cuts is described in U.S. Pat. No. 3,942,624 to Kupcikevicius issued Mar. 9, 1976. The apparatus described therein is a bag loading apparatus which comprises a cantilevered conveyor system such that a meat article may be placed on one end of the conveyor while a bag is draped around the cantilevered end of the conveyor. The movement of the conveyor causes the meat section to move along the conveyor. While this apparatus overcomes many of the shortcomings of the prior art, it utilizes a plurality of conveyor belts which by necessity are grooved or otherwise roughened so as to prevent any sliding during the conveying process.

In the meat handling art it is necessary to maintain extremely sanitary surfaces and the use of grooved conveyor belts is not conducive to such sanitary conditions. Another shortcoming of this device is the problems associated with tracking and maintaining parallelism of the cantilevered conveyors. An additional problem with this prior art device is associated with breakdown in a meat packaging line. Inevitably breakdowns and power failures occur, and due to the nature of the belts, meat articles must be carried across the conveyor for packaging; thus effectively causing a breakdown and bottleneck in the entire meat packaging line.

SUMMARY OF THE INVENTION

It is thus an object of this invention to provide a new method and apparatus for conveying and loading articles into containers.

It is a further and more particular object of this invention to provide a method and apparatus for loading fresh meat articles into flexible plastic containers.

It is a still further object of this invention to provide a method and apparatus for loading fresh meat articles into containers wherein an operator has to neither lift nor handle meat.

It is yet another object of this invention to provide a method and apparatus for loading fresh meat articles into containers wherein the contacting surfaces are readily cleanable.

It is yet a further and more particular object of this invention to provide a method and apparatus for loading articles into containers wherein belt conveyors are not utilized.

It is yet a still further object of this invention to provide a method and apparatus for loading meat articles into containers which is readily adaptable to manual operation should mechanical breakdown occur.

These, as well as other objects, are accomplished by a walking beam conveyor cantilevered at one end and being operable from two sets of beams. One set of beams is operable to move in a horizontal mode while the other set of beams is operable to move in a vertical mode.

DETAILED DESCRIPTION

According to this invention it has been found that an apparatus having in combination, a plurality of cantilevered beams divided into two sets, one set of which is movable in a horizontal mode and another set of which is movable in a vertical mode, provides a conveying function to a packaging operation such that varying sized meat articles may be packaged at the end of a cantilevered conveyor without the inconveniences associated with conveyors utilizing conventional belts. Various features and advantages of this invention will become apparent from the following description with reference to the various figures of drawing.

Figure 1:
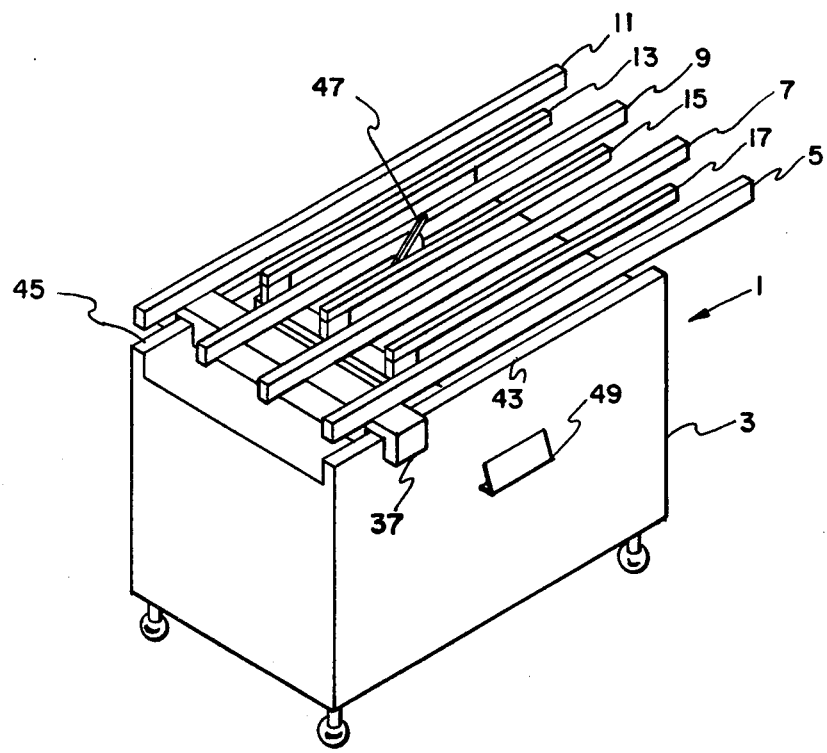
FIG. 1 is an isometric view of apparatus in accordance with this invention.

FIG. 1 of the drawings depicts in isometric form a walking beam bag loader cantilevered in accordance with this invention. The apparatus operates in normal walking beam fashion with two sets of beams each set being operable in a different dimensional mode. The apparatus 1 of FIG. 1 is comprised of a base portion 3 supporting the movable beam on the upper portion thereof. The beams are of two types. Beams represented by numerals 5, 7, 9 and 11 are operable in the horizontal mode while beams represented by numerals 13, 15 and 17 are operable in the vertical mode. The horizontally movable beams reciprocate in a horizontal plane while the vertically movable beams reciprocate in a vertical plane. The relative coordination of the two movements is such as to produce a forward motion of an article resting on the upper beam surfaces.

Figure 2:
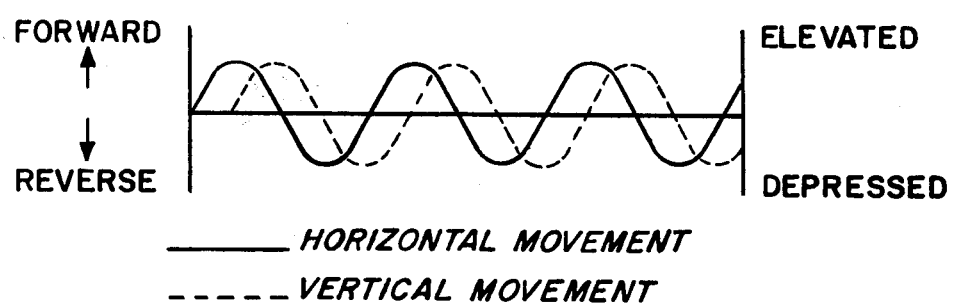
FIG. 2 graphically illustrates the movement and synchronization of the horizontally and vertically movable beams in accordance with this invention.

FIG. 2 of the drawings depicts in graphical fashion the desired synchronization of the two movements. The Figure illustrates with a solid line the movement of the horizontal beams. Thus when the solid line curve moves in the upward direction the horizontal bars are moved forward, and when in the downward direction, the horizontal bars are moving in the reverse direction. The broken line illustrates the movement of the vertically movably beams such that when the broken line is moving upwardly, the vertical beams are moving toward the elevated position. Conversely when the broken line is headed in the downward direction the vertical beams are moving toward the depressed position. The abscissa, which represents time in arbitrary units, at the zero position represents the plane of the horizontally movable beams for the vertically movable beams and the midway travel point for the horizontally reciprocal beams, i.e., a point halfway between the forward and reverse extent of reciprocal movement. Thus as the horizontally movable beam moves forward to the extent of its forward position, the vertically movable beams are below the plane of the horizontally movable beams. At the end of the forward extent of horizontal movement, the vertically movable beams rise through the plane of the horizontally movable beams to lift a conveyed article above such plane while the horizontally movable beams reciprocate to the reverse position. As the horizontally movable beams reach the end of the reverse extent to again move forward, the vertically movable beams move to a depressed position beneath the plane of the horizontally movable beams, such that an article rests on the horizontally movable beams during the forward motion thereof. Such movement continues in a cyclic fashion to convey an article resting on the surface of the beams in a forward direction, i.e., a direction of desired article progression.

The rate of article progression can be readily controlled by controlling the amplitude and frequency of the horizontally movable beams. For example, an amplitude of eight inches at 96 oscillations per minute would give a forward speed of 64 feet per minute. It is desirable to have a large amplitude so as to reduce the number of starts per unit of conveyed distance.

Figure 3:
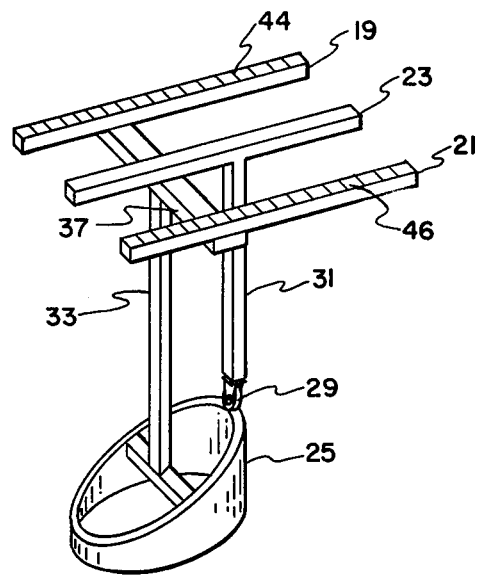
FIGS. 3 and 4 depict motion producing means of the apparatus shown in FIG. 1.
Figure 4:
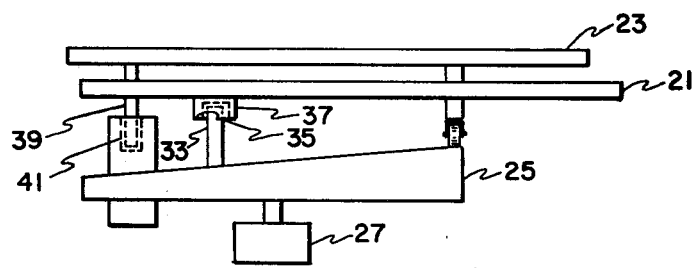

While many mechanical arrangements may be utilized to bring about the motion described above for the walking beam bag loader, a preferred construction is illustrated in FIGS. 1, 3 and 4 wherein but a single power generating means is utilized to provide both the horizontal and vertical motion. FIGS. 3 and 4 provide detail as to the operation. For purposes of simplicity only two horizontally movable beams 19 and 21 and one vertically movable beam 23 are shown in FIG. 3 of the drawings. As is readily apparent from this figure the vertically movable beam operates from a rotatable cam 25 which provides the vertical movement required of the beam 23. Cam 25 is operable by power source or motor 27 shown in FIG. 4 of the drawings. Roller 29 communicating with vertical shaft 31 is operable for reciprocating beam 23 in a vertical plane upon rotation of cam 25.

Also associated with rotatable cam 25 is a vertical beam 33 which rides within a slot 35 of a support beam 37 attached to horizontally reciprocal beams 19 and 21. Upon rotation of cam 25 vertical beam 23 riding within the slot 35 communicates a horizontal reciprocating movement to horizontally movable beams 19 and 21. It is understood that various associated support and stablizing devices may be incorporated into this structure. One such device for stablizing the vertically movable beams is illustrated in FIG. 4. The rear portion of vertically movable beam 23 has a stabilizing rod 39 which rides within cylinder 41 for purposes of stablizing the motion of the vertically reciprocal beam. In a like manner the horizontally movable beams are stabilized by attaching support beam 37 to tracks 43 and 45 as illustrated in FIG. 1 of the drawings.

It is readily apparent, however, that various other mechanical devices well within the skill of the art could be utilized to provide requisite motion. For example, the vertically movable beams may be operated totally independently of the horizontally movable beams by separate mechanical means.

In operation it is preferred that the elevation of the vertically movable beam above the plane of the horizontally beams be maintained at one inch or less. It has been found that the greater the elevation the greater the tendency is for conveyed objects to bounce along the conveyor path. For this reason the amount of elevation should be minimal. It is additionally preferred that the lower portion of the vertically movable beams not rise above the plane of the horizontally movable beams as a safety feature to circumvent the possibility of an operator's finger being trapped beneath the surface of the vertically movable beams.

An additionally preferred feature of this invention is the use of scores or tracks along the surface of the horizontally reciprocal beams. These tracks are illustrated in FIG. 3 of the drawings as scores 44 and 46. The use of scores or tracks prevents a conveyed object such as a piece of fresh red meat from sliding on the beams during the conveying process. An unexpected advantage of utilizing scores only on the horizontally reciprocal beams is that in the event of a power failure, the vertically reciprocal beams may be elevated to the elevated position and utilized as a sliding surface. This is a significant improvement over the prior art which had to, during a breakdown or power failure, manually move meat articles without contacting the otherwise non-sliding surfaces of conveying belts.

An additionally preferred feature of the apparatus of this invention is the use of control means for deactivating and activating the operation of power source 27. For this purpose a depressable trigger 47 is illustrated in FIG. 1 of the drawings which deactivates power source 27 upon arrival thereon of a conveyed article. The deactivation of the beams permits an operator to drape an appropriately sized container through and under the appropriate number of beams for receipt of the conveyed article. Preferably a knee actuated lever such as 49 permits the operator to reactive the motor 27 when the container is properly positioned for receipt of the conveyed article.

Figure 5:
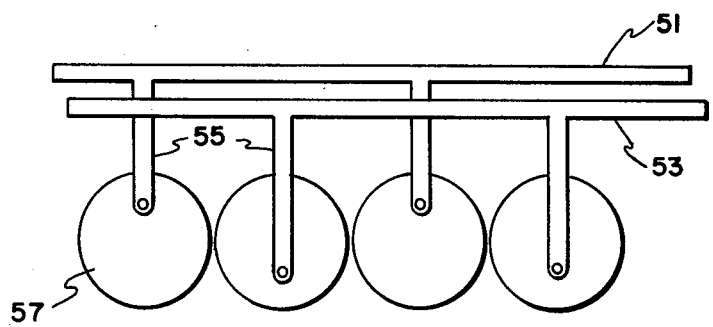
FIG. 5 illustrates an alternative embodiment of this invention.

An alternative embodiment of this invention is shown in FIG. 5 of the drawings wherein beams 51 and 53 are adapted to operate in a swinging fashion such that the beams have both a horizontal and a vertical displacement during operation. Many mechanical arrangements are available for this type of construction. However, the arrangement shown in FIG. 5 is a simple rotational arrangement wherein a reciprocating beams 51 and 53 are attached by vertical supports 55 to a rotating cranks 57. In this arrangement alternate beams are attached to their respective rotating cranks in a manner so as to be 180° out of phase with the immediately adjacent beams. This arrangement also provides for a cantilevered construction to facilitate the loading of a container. This arrangement may also be facilitated by the use of one set of beams having a lesser extent in the direction of progression than the 180° off set counterpart.

This alternative embodiment does not require the use of scores to prevent sliding since the motion of the conveyed article is continuous. This construction provides for a smooth sliding surface in the event of breakdown regardless of beam position.

An additional embodiment within the scope of this invention is a modification of the last discussed embodiment wherein one set of beams is stationary and the other moves with the swinging movement discussed above. In this embodiment the swinging set of beams moves forward while above the plane of the stationary beams and backward while below the plane of the stationary beams. This embodiment is easily visualized from FIG. 5 with alternate beams being immobilized.

While all embodiments discussed above illustrate and describe an arrangement wherein alternate beams operate in a mode different from the next adjacent beams, it is readily understood that if desirable adjacent beams be operable in the similar mode so long as the net effect is to provide conveying action in the desired direction of article progression.

It is thus seen that the method and apparatus of this invention provide a novel technique whereby articles may be conveyed into containers. The method and apparatus of this invention further provide an apparatus which does such conveying without the use of conventional belts and which provides a sliding surface in the event of a power failure while at the same time providing a gripping surface when in operation. Various modifications and alterations will be apparent to those skilled in the art. Such variations, however, are within the spirit and scope of the present invention as is defined by the following appended claims.

What is claimed is:

1. An apparatus for conveying articles in a direction of progression, comprising:
   a group of beams movable only horizontally;
   a group of beams movable only vertically; and
   means for providing reciprocating movement to said vertically movable beams and said horizontally movable beams, and wherein said beams are cantilevered in the direction of article progression and are spaced apart at their respective termini so as to permit insertion of a container both between and beneath said beams at the termini thereof,
   said means for providing reciprocating movement being a single rotatable cam for having a cam follower for vertically reciprocating said vertically movably beams, said cam having attached thereto a vertical beam for horizontally reciprocating said horizontally movable beams.

2. The apparatus according to claim 1 further including means for detecting the presence of an article on the conveying surface and for deactivating said means for providing reciprocating movement in response thereto.

3. The apparatus according to claim 2 further including means for reactivating said means for providing reciprocating movement after deactivation by said detecting means.

4. The apparatus according to claim 1 wherein said horizontally movable beams comprise an upper surface having scores therein to provide a high friction surface thereon.

5. A process for conveying articles in a direction of progression, comprising:
   placing an article upon parallel beams extending in said direction of progression, a group of said beams being movable horizontally and a second group of said beams being movable vertically and wherein said beams are cantilevered in the direction of progression and spaced apart from one another; p1 moving said horizontally movable beams in a direction of progression to incrementally move said article;
   moving said vertically movable beams upwardly and through the place defined by the upper surface of said horizontally movable beams to lift said article above said plane;
   moving said horizontally movable beams in a direction opposite said direction of progression while said vertically movable beams hold said article above said plane;
   moving said vertically movable beams to a depressed position beneath said plane to place said article upon said horizontally movable beams;
   moving said horizontally movable beams in said direction of progression while said vertically movable beams are in said depressed position to move said article an additional increment;
   continuing said steps of moving in a continuous and cyclic manner to incrementally advance said article toward the ends of said beams; and
   inserting a container partially between and under said ends of some of said beams to surround said article and said ends of said some of said beams and thus receive said article as it is incrementally conveyed from said ends of said some of said beams.

6. The process according to claim 5 further including deactivating the motion of said beams prior to inserting said container and reactivating said motion when said container is positioned.

7. The process according to claim 5 including the further step of vertically reciprocating said horizontally reciprocal beams and horizontally reciprocating said vertically reciprocal beams to provide a swinging motion which is synchronized to incrementally convey an article resting on said beams in the direction of progression.

* * * * *

UNITED STATES PATENT OFFICE
CERTIFICATE OF CORRECTION

Patent No. 4,286,422  Dated September 1, 1981

Inventor(s) Milton A. Howe, Jr.

It is certified that error appears in the above-identified patent and that said Letters Patent are hereby corrected as shown below:

Column 6, line 12, delete "pl".

Signed and Sealed this

Third Day of November 1981

[SEAL]

Attest:

GERALD J. MOSSINGHOFF

Attesting Officer   Commissioner of Patents and Trademarks